(12) United States Patent
Brow

(10) Patent No.: US 11,328,248 B2
(45) Date of Patent: May 10, 2022

(54) AUTOMATED SECURED PACKAGE DELIVERY SYSTEM WITH SIMULTANEOUS CONFIRMATION TO PURCHASER AND SHIPPER

(71) Applicant: Georges Raymond Brow, Georgetown Royalty (CA)

(72) Inventor: Georges Raymond Brow, Georgetown Royalty (CA)

( * ) Notice: Subject to any disclaimer, the term of this patent is extended or adjusted under 35 U.S.C. 154(b) by 8 days.

(21) Appl. No.: 16/409,068

(22) Filed: May 10, 2019

(65) Prior Publication Data

US 2019/0370740 A1     Dec. 5, 2019

(30) Foreign Application Priority Data

Jun. 5, 2018   (CA) .................................. CA 3007249

(51) Int. Cl.
*G06Q 10/08*       (2012.01)
*G07C 9/00*        (2020.01)

(52) U.S. Cl.
CPC ..... *G06Q 10/0833* (2013.01); *G06Q 10/0832* (2013.01); *G06Q 10/0835* (2013.01); *G07C 9/00896* (2013.01); *G07C 2009/0092* (2013.01)

(58) Field of Classification Search
None
See application file for complete search history.

(56) References Cited

U.S. PATENT DOCUMENTS

| | | | |
|---|---|---|---|
| 8,010,462 B2 | 8/2011 | Kinori et al. | |
| 10,402,744 B2 * | 9/2019 | Behuria | G06N 20/00 |
| 10,492,636 B2 * | 12/2019 | Ruben | A47G 29/20 |
| 2015/0102903 A1 * | 4/2015 | Wilkinson | A47G 29/141 340/5.61 |
| 2017/0011605 A1 * | 1/2017 | Grabham | G06Q 10/0833 |
| 2017/0286905 A1 | 10/2017 | Richardson et al. | |
| 2018/0075400 A1 * | 3/2018 | Scalisi | G06Q 10/0833 |
| 2018/0165637 A1 * | 6/2018 | Romero | G06Q 10/0833 |
| 2018/0177319 A1 * | 6/2018 | Willis | G06Q 10/1097 |
| 2018/0260777 A1 * | 9/2018 | Judge | G07C 9/00896 |
| 2019/0180544 A1 * | 6/2019 | Newcomb | E05B 47/0001 |

FOREIGN PATENT DOCUMENTS

WO   WO-2013086039 A1 *  6/2013 ........... B65G 1/0485

* cited by examiner

*Primary Examiner* — Scott A Zare

(57) ABSTRACT

An automated, secured package, delivery system which provides simultaneous confirmation to the purchaser and shipper, and possesses a remote locking/unlocking feature whereby delivery of the shipped item and retrieval thereof, can be effected. When an item is delivered to a purchaser of the item, a confirmation of the delivery and the status of the item is sent to each of the purchaser and a shipper of the item over a network. Remote locking and unlocking of a component accessible by the purchaser over the network is provided, which can be locked upon delivery of the item, and unlocked by the purchaser when desired to access the item.

12 Claims, 2 Drawing Sheets

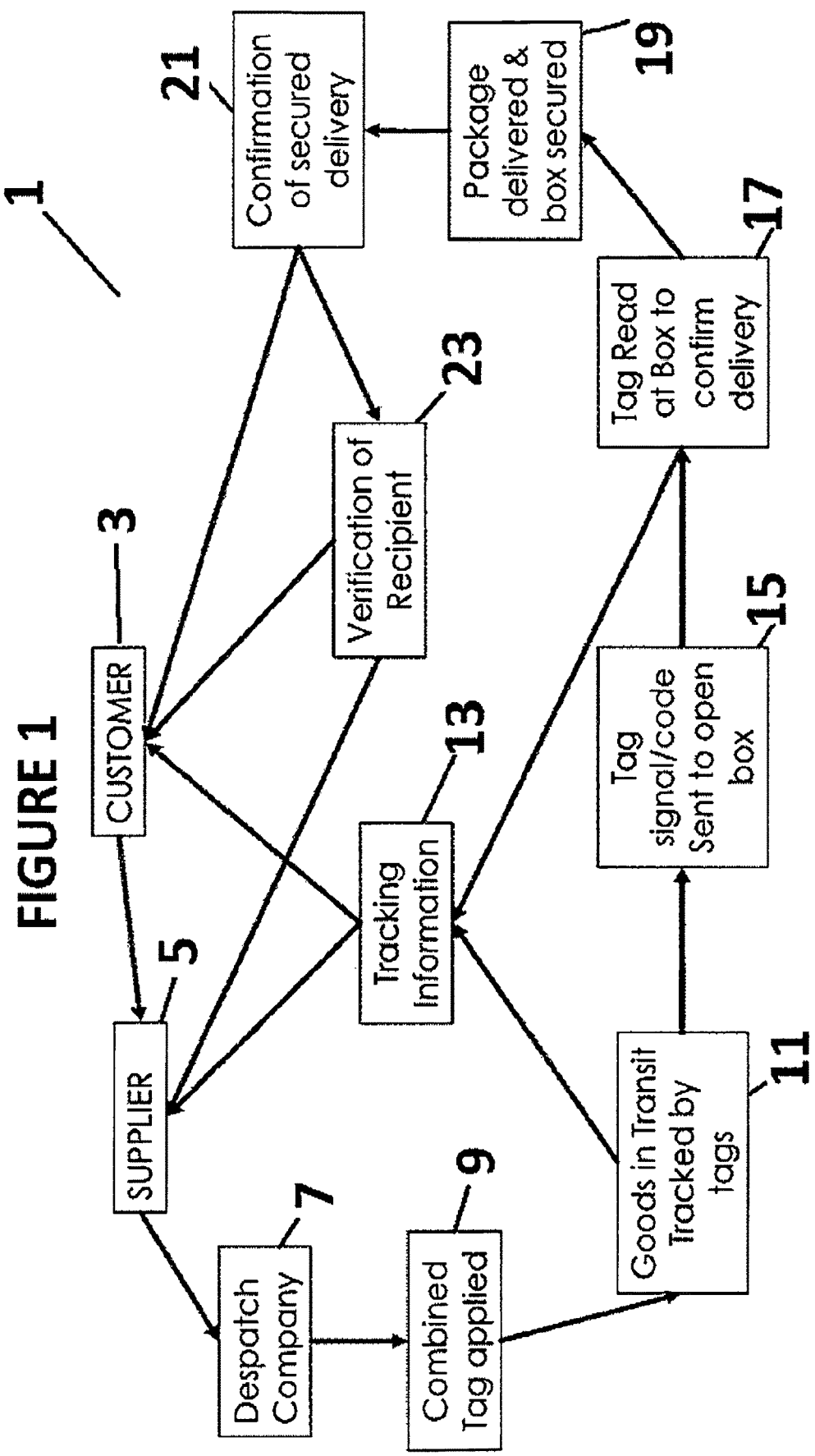

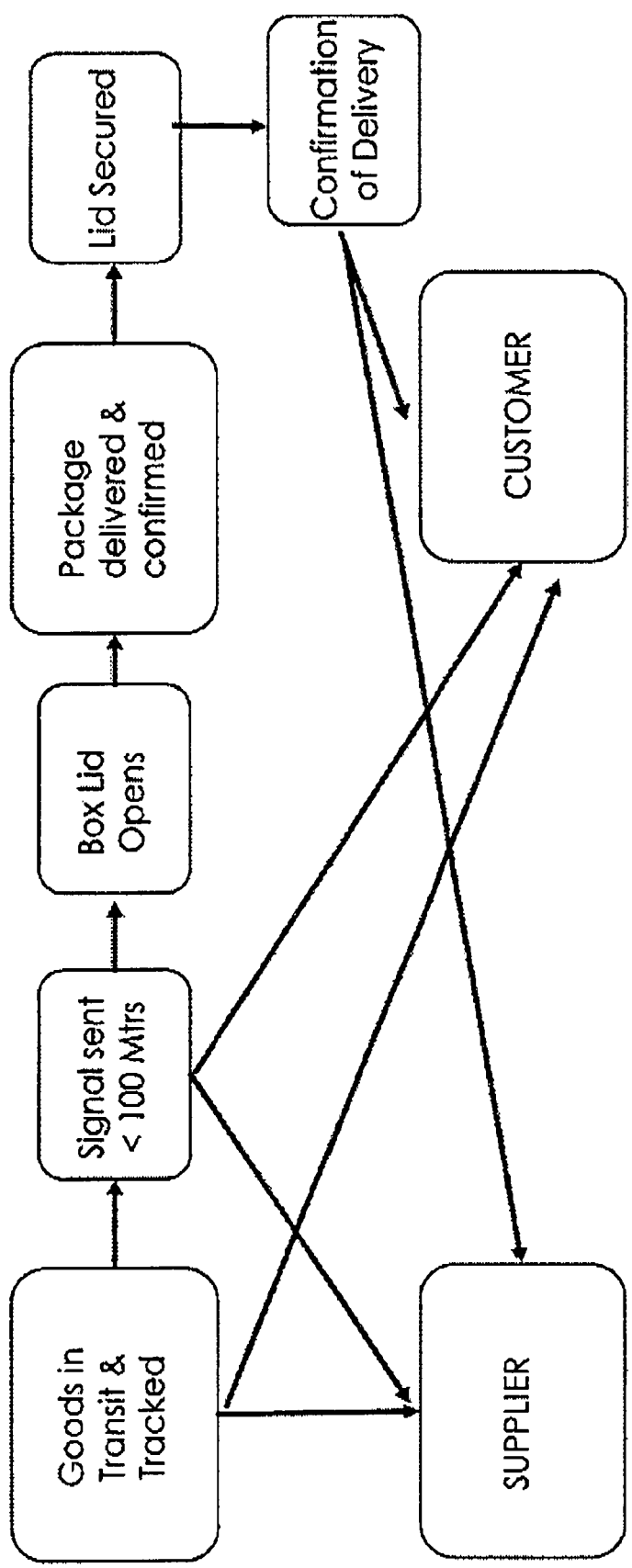

AUTOMATED SECURED PACKAGE DELIVERY SYSTEM WITH SIMULTANEOUS CONFIRMATION TO PURCHASER AND SHIPPER

FIELD OF THE INVENTION

The present invention relates generally to an automated secured package delivery system, and, more particularly, to an automated secured package delivery system, and an apparatus for receiving and shipping a delivery item, which can provide simultaneous confirmation and data to the purchaser, shipper and others, if desired.

DESCRIPTION OF THE PRIOR ART

It is well known that parcel or package delivery services have become commonplace in recent years, however in some cases these services have difficulty delivering to individual homes as, for example, the occupant of the home is often not there at the time of delivery and thus a carrier may have to visit the home multiple times to effect delivery. In other situations, a parcel delivery person may leave a parcel unattended, which may be stolen, causing inconvenience for the occupant and cost for the retailer. As such, parcel theft and the security of parcels/packages has become a challenge for both retailers and consumers.

It is known that some retailers have resorted to placing containers at a predetermined location, such as a grocery store or post office. The parcel recipient then receives a message that the parcel has been delivered to the predetermined location. The parcel recipient then travels to and retrieves the parcel from the predetermined location. However, this can be inconvenient to the purchaser. In other situations it is also known to place package/parcel deliveries in a lockable container present at a home upon delivery. However, this generally requires manual locking and unlocking of such a container which may not be convenient for either the delivery person or a purchaser, who may wish to have someone else retrieve the delivered package sooner than when the purchaser returns to the home. Further such systems do not provide each of the shipper and purchaser with definitive confirmation that safe and secure delivery has been effected.

Accordingly, there is need for an automated secured package delivery system, and a securable apparatus for receiving a delivery item, which can provide simultaneous confirmation and package status information to the purchaser, shipper and others, if desired, and which possesses a remote locking/unlocking feature whereby delivery of the shipped item and retrieval thereof, can be effected. To this end, the present invention effectively addresses this need.

SUMMARY OF THE INVENTION

A general object and advantage of the present invention is to provide an improved automated secured package delivery system, and an apparatus for receiving a delivery item.

A still further object and advantage of the present invention is to provide an improved automated secured package delivery system, and an apparatus for receiving a delivery item, with simultaneous confirmation to the purchaser, shipper and others, if desired.

A still further object and advantage of the present invention is to provide an improved automated secured package delivery system, and an apparatus for receiving a delivery item, which can receive and protect temperature and humidity sensitive packages and to record and transmit status of said package, and which has anti-vandal and anti-theft features.

According to one aspect of the present invention, there is provided an automated package delivery system comprising the steps of delivering an item to a purchaser accessible entity for a purchaser of the item; delivering to at least each of the purchaser and a shipper of the item a confirmation of the delivery of the item; and wherein the purchaser accessible entity is constructed and arranged to be accessible over a network to permit remote locking and unlocking of the purchaser accessible entity whereby the item can be locked in the purchaser accessible entity upon the delivery of the item, and unlocked by the purchaser when desired to access the item.

According to another aspect of the present invention, there is provided an automated package delivery system comprising the steps of delivering an item to a purchaser accessible entity for a purchaser of the item; delivering to at least each of the purchaser and a shipper of the item a confirmation of the delivery of the item; providing at least one of an RFID tracking tag and NFC tracking tag to the delivery item; wherein the purchaser accessible entity is constructed and arranged to be accessible over a network to permit remote locking and unlocking of the purchaser accessible entity whereby the item can be locked in the purchaser accessible entity upon the delivery of the item, and unlocked by the purchaser when desired to access the item.

According to another aspect of the present invention, there is provided an apparatus for receiving a delivery item comprising a processor; a network connection in communication with the processor; a passcode entry interface in communication with the processor to permit entry of an access code; a confirmation module in communication with the processor and the network connection for delivering to at least each of a purchaser and a shipper of the item a confirmation of the delivery of the delivery item; and an unlocking and locking module in remote communication with the processor and the network connection, for permitting an unlocking of the apparatus to allow for delivery and retrieval of the delivery item, and for permitting a locking of the apparatus after the delivery item is delivered.

According to a still further aspect of the present invention, there is provided an apparatus for confirming delivery of a delivery item to a site proximate to the apparatus comprising a processor; a network connection in communication with the processor; and a confirmation module in communication with the processor and the network connection for delivering to at least each of a purchaser and a shipper of the delivery item a confirmation of the delivery of the delivery item to the site proximate to the apparatus.

According to a still further aspect of the present invention, there is provided a An automated package delivery system comprising the steps of delivering an item to a location proximate to an apparatus comprising a processor; a network connection in communication with the processor; and a confirmation module in communication with the processor and the network connection for delivering to at least each of a purchaser and a shipper of the delivery item a confirmation of the delivery of the delivery item to the site proximate to the apparatus; delivering to at least each of the purchaser and the shipper of the item a confirmation of the delivery of the item to the location proximate to the apparatus; providing at least one of an RFID tracking tag and NFC tracking tag to the item; wherein the apparatus is constructed and arranged to be accessible over a network.

BRIEF DESCRIPTION OF THE DRAWINGS

A preferred embodiment of the present invention is described below with reference to the accompanying drawings, in which:

FIG. 1 illustrates a first embodiment of the automated secured package delivery system and weathertight apparatus of the present invention; and FIG. 2 illustrates an overview of the arrival of the delivery of the delivered item to the apparatus of the present invention.

DESCRIPTION OF THE PREFERRED EMBODIMENT

The present invention relates to an automated secured package delivery system and weathertight, water-proof and fire resistant apparatus that can provide simultaneous confirmation to the purchaser, shipper and others of the delivery of an item, if desired, and which possesses a remote locking/unlocking feature whereby delivery of the shipped item and retrieval thereof, can be effected. Such deliveries could be affected by way of, for example, Amazon, FedEx, Purolator, UPS, or other delivery services, as would be apparent to one skilled in the art.

With reference now to the drawings, and in particular to FIGS. 1 and 2, the automated package delivery system, generally designated by the reference numeral 1 in FIG. 1, will now be described. As seen in FIG. 1, the customer 3, places an order for a delivery item that is received by the supplier/distributor 5, who then, in one embodiment, forwards the order to a dispatch company 7, who will later forward this order to the customer 3. It will be understood however, that the supplier can merely dispatch such an order themselves, such as through a shipping arm of their own organization, such as Amazon utilizes, for example. Once this order has been placed, a package for shipping is prepared sporting, in one embodiment, an RFID (radio frequency identification) tracking tag, or, in an exemplary embodiment, a combination of an RFID tracking tag and NFC tracking tag (near field communication (NFC) both of which are a wireless radio communications standard. GPS tracking, bar codes, etc. could also be utilized.

It is well known that retailers and parcel shipping companies in particular prefer barcodes and RFID as a way to keep tabs on inventory supplies and shipments, as they can be encoded with a unique code.

Once the delivery item is en route 11 to its destination, the tracking tags 9 then provide the tracking (shipment) information 13 to each of the purchaser/customer 3, and the shipper/supplier 5. It will be understood that, with respect to the present invention, delivering an item entails shipping an item to a purchaser accessible entity for a purchaser of the item, such as a container, bag or the like, which could be located at, but is not limited to, a house, an apartment, a mailbox, a lockbox, a vehicle or a place of employment.

It will also be understood that the delivery system of the present invention, and apparatus therefor, is electronically connected to the Internet and/or other communications systems via wifi, radio etc, for example, through means of an accessible network and processor interconnected with the system and apparatus. It will also be understood that, in one embodiment the apparatus further comprises a door to allow access to an interior part of the apparatus and comprises an accessible lock, which can either be opened by keypad access using a PIN number, for example, or a manual locking device, and that the apparatus could come in numerous sizes and variations, as would be apparent to one skilled in the art. It will also be understood that access to the delivery receptacle containing the delivered item can be via a key, a manually typed code, an RFID or similar encoded tag (NFC tracking tag), biometrically scanned fingerprint, iris reading or the like; or other data transfer system or recipient recognition device that will unlock the delivery receptacle.

In an exemplary embodiment, once a courier company or other transport mode (even a drone) carries the delivery item to the destination, once this item is within, for example, 100 metres of the destination the customer's delivery apparatus senses the impending delivery by means of the tracking tag(s) sensed by the purchaser's network connection. In such manner, the delivery item is identified by this tracking code sent to the customer upon placement of the order. At this point, the delivery service using the tracking tags is notified that there is a delivery item at the customer's location, whereupon the electronic tag signal signal activates a switch to unlock the apparatus 15, whereby the delivery item can be delivered by the delivery service.

Once delivery has occurred, the tracking tags confirm the delivery of the item 17, whereby, through the network and processor associated with the apparatus, the apparatus receiving the item may be closed and locked 19. When a confirmation module of the processor can confirm that secured delivery 21 has been effected, the network connection delivers a verification of the recipient 23 to each of the customer 3 and the shipper 5. It will be understood that, the delivered item must be confirmed to be in the container, through the NFC or RFID, before it can be locked. After the container is locked, the network connection then delivers a verification of the recipient 23 to each of the customer 3 and the shipper 5.

In an alternative embodiment, if the item to be delivered arrives and the container (or bag or the like) is full and the package (or packages) is too large in size to be delivered within such a container (even if it possesses multiple compartments within), the item can be laid beside the container. The RFID tag (since RFID-radio frequency identification is a form of wireless communication that incorporates the use of electromagnetic or electrostatic coupling in the radio frequency portion of the electromagnetic spectrum to uniquely identify an object) on the parcel/item to be delivered is operably able to communicates with the container (or bag or the like) when it is within a desired range (for example, under 1.5 m or 5 ft). The container, in such circumstance, can identify the parcel/item to be delivered and, based on what was described previously herein, is able to ascertain exactly what the parcel/item being delivered is, where it came from, and who it is to be delivered to, (in the exact same manner for deliveries placed within the container, as previously described herein). In this situation, the customer and shipper (eg. Walmart, Loblaws or Amazon, for example purposes only) are notified of the successful delivery and that the item itself has been delivered unsecured, and is not in the container.

In this embodiment, the container will emit, for example, an intermittent, continuous signal (such as beeping) indicating that the externally placed package is still within the desired range of the container. It should be noted that, in this situation, the onus is on the customer to retrieve the item immediately in such an unsecured delivery scenario. In the event that this externally placed package is removed by anyone not having or utilizing the previously described means of access to the delivery container/receptacle, then an alarm (audible and/or otherwise) will sound and the customer and shipper of the item will be immediately advised. If there is surveillance video, or a camera, at the delivery site the theft time, and any other particulars thereof, will be noted on the video/camera recording for later retrieval.

In an exemplary embodiment, the apparatus further comprises a camera (whether within the apparatus or remotely located within proximity of the apparatus) in communication with each of the processor and the network connection, whereby, once delivery has been effected, the camera delivers to at least each of the purchaser and the shipper a confirmation of the delivery of the delivery item, which is sent over the network connection, to provide a visual proof of the delivery of the delivery item.

In an alternative embodiment proof of delivery can include a packet of information including the temperature & humidity within the apparatus from time of delivery to the moment the apparatus is opened by the authorized person. Expanding upon this embodiment, the container apparatus can be environmentally controlled (heat, cooled and/or humidity), whereby the container, by means of the processor and its connection to the network, can be remotely activated by any of the shipper or recipient to ready the container's internal environment for packages requiring a climate controlled environment. Further, the container's environment history can be sent to any of the recipient and shipper via the network connection (to verify that conditions for such a delivery item were maintained while in the container).

In addition, a barcode or a "smart chip" could also be printed and placed on the exterior of the delivery item, to aid in the shipping/scanning process. In a further embodiment, the system and apparatus of the present invention could encompass anti-vandal and anti-theft features, whereby an alarm would sound, for example, if unauthorized retrieval of the delivery item is attempted, and notification of such could be sent over the network to any of the recipient and shipper.

In a still further embodiment, the automated secured package delivery system and weathertight apparatus comprises delivery of a package/item without delivery to a securable enclosure, container or the like. In this embodiment, delivery of the item could be placed near/proximate to a stand-alone, Internet connected, small device that simply confirms and identifies the package delivery near/proximate to the device. In this scenario, It should be noted that, the onus is on the customer to retrieve the item immediately in such an unsecured delivery scenario. The RFID tag or equivalent radio frequency tag on the parcel/item to be delivered is operably able to communicate with the stand-alone, Internet connected, small device when it is within a desired range (for example, under 1.5 m or 5 ft). The device, in such circumstance, can identify the parcel/item to be delivered and, based on what was described previously herein, is able to ascertain exactly what the parcel/item being delivered is, where it came from, and who it is to be delivered to (in the exact same manner for deliveries placed within a container, as previously described herein). In this situation, the customer and shipper are notified of the successful delivery and that the item itself has been delivered unsecured, and is not in a container, but rather beside the stand-alone, Internet connected, small device.

In this embodiment, the device itself can, if desired, emit, for example, an intermittent, continuous signal (such as beeping) indicating that the externally placed package is still within the desired range of the device. In the event that this externally placed package is removed by anyone not having or utilizing the previously described means of access to the delivered package, then an alarm (audible and/or otherwise) will sound and the customer and shipper of the item will be immediately advised. If there is surveillance video, or a camera, at the delivery site the theft time, and any other particulars thereof, will be noted on the video/camera recording for later retrieval. Retrieval of the item by the customer utilizing, for example, an application with a unique code on a hand held device in communication with the delivery device, or by entering a unique code via a keypad on the device itself, though it will be understood that many variations to this are possible.

It will also be understood that the delivery system of the present invention, and apparatus therefor, could be implemented and utilized through use of "blockchain" technology. Of course, in this embodiment, it would be understood by one skilled in the art that a "blockchain" is a decentralized, distributed and public digital ledger used to record transactions across many computers so that any involved record cannot be altered retroactively, without the alteration of all subsequent blocks. Such a system would allow the participants to verify and audit transactions independently and relatively inexpensively, and the blockchain database could be managed autonomously using a peer-to-peer network and a distributed timestamping server.

In a still further embodiment, the delivery system of the present invention, and apparatus therefor, may feature lights and/or sounds that indicate the readiness of the apparatus to accept packages, and to indicate whether or not a package has been secured. In a further embodiment, the system and apparatus may also be utilized have a scale function associated therewith to provide confirmation of a package's weight.

It will be understood that the present provides an automated secure package delivery system, and a securable apparatus for receiving delivery item also functions using the identical processes and security features to ship original packages or to return items from residences or business locations. This delivery system eliminates the need to travel to an external drop off location or for an individual to wait for a delivery company representative to pick up a package in person.

The present invention has been described herein with regard to preferred embodiments. However, it will be obvious to persons skilled in the art that a number of variations and modifications can be made without departing from the scope of the invention as described herein.

The embodiments of the invention in which an exclusive property or privilege is claimed are defined as follows:

1. An automated package delivery system comprising:
  a purchaser accessible apparatus for receiving delivery of an item fora purchaser of the item, the purchaser accessible apparatus comprising a processor and a delivery receptacle;
  wherein the processor is configured to:
  communicate over a network with a shipper of the item and the purchaser of the item to:
    deliver to at least each of the purchaser and a shipper of the item a confirmation of the delivery of the item;
    permit remote locking and unlocking of the delivery receptacle, whereby the item is locked in the delivery receptacle upon the delivery of the item, and unlocked by the purchaser to access the item;
  wherein the delivery receptacle is constructed and arranged to be environmentally controlled, whereby the delivery receptacle is configured to be remotely activated by any of the shipper or the purchaser to ready an internal environment of the delivery receptacle, wherein the processor is further configured to determine if the item has been placed outside the delivery receptacle but within a pre-set range of the delivery receptacle at a site proximate to the delivery receptacle, the site for receiving items that exceed a storage capacity of the delivery receptacle;

wherein the processor is further configured to collect environmental data characterizing an internal environment of the delivery receptacle from a time of delivery of the item to a time the delivery receptacle is opened by the purchaser, the environment data comprising temperature data and humidity data; and wherein the processor is further configured to send the environmental data to any of the purchaser and the shipper of the item when the purchaser accessible apparatus is opened by the purchaser.

2. The system of claim 1, further comprising the delivery receptacle being selected from a group consisting of a house, an apartment, a mailbox, a lockbox, a vehicle or a place of employment.

3. The system of claim 1, wherein an image from a camera in communication with the network is delivered to at least each of the purchaser and the shipper of the item to provide a visual proof of the delivery of the item.

4. The system of claim 1, wherein the item is provided with an RFID (radio frequency identification) tracking tag.

5. The system of claim 1, wherein the item is provided with a combination of an RFID tracking tag and NFC tracking tag (near field communication).

6. The system of claim 5, wherein tracking information is provided to each of the purchaser and the shipper based on the tracking tags.

7. The system of claim 1, further comprising the delivery receptacle having a lockable door to allow access to an interior part of the delivery receptacle.

8. The system of claim 1, wherein the delivery receptacle is opened using an access method for unlocking the delivery receptacle comprising one of a key, a manually typed code, a manual locking device, an RFID or similar encoded tag, a biometrically scanned fingerprint, an iris reading or a PIN number.

9. The system of claim 8, further comprising an alarm activatable by removal of the item without entry of the access method for the delivery receptacle to notify the purchaser and the shipper of the item.

10. The system of claim 1, wherein the delivery confirmation is sent to the purchaser and the shipper of the item after the item has been locked and secured in the delivery receptacle.

11. The system of claim 1, wherein the purchaser accessible further comprises:

a confirmation module in communication with the processor and the network for delivering to the purchaser and the shipper of the item the confirmation of the delivery of the delivery item.

12. The system of claim 1, wherein the pre-set range is under 5 feet.

* * * * *